(12) United States Patent
Amico (10) Patent No.: US 11,113,415 B1
(45) Date of Patent: Sep. 7, 2021

(54) PRIVACY AND SECURITY OF PERSONAL INFORMATION STORED IN COMMUNICATIVELY CONNECTED AND SYNCHRONIZED DEVICES IN A SHORT-RANGE WIRELESS NETWORK

(71) Applicant: Jack Cooper Logistics, LLC, Kennesaw, GA (US)

(72) Inventor: Andrea Amico, Marietta, GA (US)

(73) Assignee: PRIVACY4CARS, Inc., Kennesaw, GA (US)

( * ) Notice: Subject to any disclaimer, the term of this patent is extended or adjusted under 35 U.S.C. 154(b) by 337 days.

(21) Appl. No.: 16/282,986

(22) Filed: Feb. 22, 2019

Related U.S. Application Data (60) Provisional application No. 62/633,740, filed on Feb. 22, 2018.

(51) Int. Cl.
| | |
|---|---|
| *G06F 21/62* | (2013.01) |
| *H04W 12/02* | (2009.01) |
| *G06F 11/14* | (2006.01) |
| *G06F 21/60* | (2013.01) |
| *H04W 12/03* | (2021.01) |
| *H04W 12/50* | (2021.01) |
| *H04W 12/71* | (2021.01) |

(52) U.S. Cl.
CPC ...... *G06F 21/6245* (2013.01); *G06F 11/1446* (2013.01); *G06F 21/606* (2013.01); *H04W 12/02* (2013.01); *H04W 12/03* (2021.01); *H04W 12/50* (2021.01); *H04W 12/71* (2021.01)

(58) Field of Classification Search
CPC .............. G06F 21/606; G06F 21/6245; G06F 11/1446; H04W 12/02; H04W 12/03; H04W 12/50
See application file for complete search history.

(56) References Cited

U.S. PATENT DOCUMENTS

| | | | | |
|---|---|---|---|---|
| 9,609,025 | B1 * | 3/2017 | Betzler | H04L 63/0245 |
| 2004/0025053 | A1 * | 2/2004 | Hayward | G06F 21/6245 726/26 |
| 2013/0060820 | A1 * | 3/2013 | Bulusu | G06F 16/24564 707/803 |
| 2014/0101784 | A1 * | 4/2014 | Shukla | G06F 21/6254 726/30 |
| 2015/0039738 | A1 * | 2/2015 | Subramani | G06F 21/6218 709/223 |

* cited by examiner

*Primary Examiner* — Robert B Leung
(74) *Attorney, Agent, or Firm* — King & Spalding (57) ABSTRACT

A system includes a first device that is communicatively coupled to and synchronized with a second device such that the second device stores privacy information of a user that is contained in a data file of the first device. Upon receiving a request to remove the privacy information of the user from the second device, the first device creates and stores a backup copy of the data file. Then, the first device deletes the data file from the first device. Further, a replacement file for the data file is created. The replacement file comprises non-sensitive information. The replacement file is uploaded to the second device to overwrite the privacy information with the non-sensitive information. Then, a radio frequency communication between the first device and the second device is disabled and the data file is restored using the backup copy.

17 Claims, 4 Drawing Sheets

PRIVACY AND SECURITY OF PERSONAL INFORMATION STORED IN COMMUNICATIVELY CONNECTED AND SYNCHRONIZED DEVICES IN A SHORT-RANGE WIRELESS NETWORK

CROSS REFERENCE TO RELATED APPLICATIONS

This application claims priority to U.S. Provisional Application No. 62/633,740 titled "Privacy and Security of Personal Information Stored in Communicatively Connected and Synchronized Devices in a Wireless Personal Area Network," and filed on Feb. 22, 2018 in the name of Andrea Amico, the entire content of said application being incorporated herein by reference.

TECHNICAL FIELD

Embodiments of the present disclosure relate generally to information security, and more particularly to data privacy and security of personal information stored in target devices that are communicatively connected and synchronized with a source device in a short-range wireless network.

BACKGROUND

The advancement of wireless communication standards, such as Bluetooth, has resulted in an exponential growth in the usage of wireless personal area networks in numerous and diverse environments for easy and quick transfer of data between electronic devices. One such environment is the automobile industry where an owner or a user of the vehicle is able to use wireless personal area network communication standards to pair, connect, and synchronize their electronic devices with advanced in-vehicle systems of their vehicle, (such as the infotainment system and other systems as OEM or third party telematics) for conveniences such as hands-free operation or for other non-entertainment purposes (e.g. to identify who are the occupants in the vehicle, where each occupant of the vehicle may be seated, etc.). In addition, other devices in the "connected ecosystem" may be connected to the vehicle (e.g. in smarthome applications, where the home can sense the presence of a specific vehicle by sensing its Bluetooth or WiFi or cellular signals).

In modern vehicles, the in-vehicle systems are capable of storing personally identifiable information of an owner or a user of the vehicle when they connect their electronic devices to the in-vehicle systems. For example, a garage door opener of the owner or the user may be paired with a wireless system of the vehicle. Thus, the vehicle may store and retain data associated with the owner or the user (hereinafter both the owner and the user may be referred to as a 'user') arriving, opening the garage, and/or leaving. In another example, an infotainment system of the vehicle with Bluetooth and/or navigation capability may store personal addresses, user contacts, phone numbers, financial information, points of interests of the user, navigation data of the user, home address of the user, and/or other personal information corresponding to the user of the vehicle. Due to the sensitive nature of this information that is stored in the vehicle, the user may desire to erase the information before the vehicle is handed over to the next user/buyer, such as, when a user sells his vehicle or when a user returns a rental vehicle.

Therefore, there exists a need for a technical solution to the technical problem of lack of protection of consumers' privacy and the consumer's personal information that the consumer may share with target devices (e.g., in-vehicle systems of vehicles) in a connected environment (e.g., in a short-range wireless network). There exists a need for technology that allows a user to be in control of the sensitive or personal information of the user that the user shares with a target device, and technology that allows the sensitive or personal information of the user to be cleaned from target devices with which the user shares information, e.g., in short-range wireless networks, to mitigate the risks associated with the breach of privacy information of the users. Also, there exists a need for technology that improves information security in vehicles.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure is related to a privacy information cleaning system. The privacy information cleaning system includes a first device that is communicatively coupled to a second device. The first device comprises a privacy information cleaning engine that receives, at the first device, a request to clean privacy information of a user from a second device. The privacy information is shared with the second device by the first device and is stored in the second device. Responsive to receiving the request, the privacy information cleaning engine creates and stores a backup copy of a data file of the first device that comprises the privacy information of the user that has been shared with and stored in the second device. Then, the privacy information cleaning engine deletes the data file from the first device. Further, the privacy information cleaning engine creates a replacement file for the data file that is deleted. The data entries in the replacement file are populated with non-sensitive data. The privacy information cleaning engine uploads the replacement file to the second device to overwrite the privacy information of the user stored in the second device with the data entries of the replacement file. Responsively, the privacy information cleaning engine disables a radio frequency communication channel that allows the first device to communicate with the second device. The privacy information cleaning engine restores the data file in the first device using the backup copy of the data file and then, enables the radio frequency communication channel when the first device is outside a radio range of the second device.

In another aspect, the present disclosure relates to a computer readable medium comprising computer readable instructions which when executed by a processor of a source computing device causes the source computing device to perform a method. The method includes creating and storing a backup copy of a data file of the source computing device in response to receiving a request to clean privacy information of a user from a target device. The data file comprises the privacy information of the user that has been shared with the target device by the source computing device and is stored in the target device. The source computing device is communicatively coupled to the target device. Further, the method includes deleting the data file, and creating a replacement file for the data file that is deleted. The data entries in the replacement file are populated with non-sensitive data. The method includes synchronizing the source computing device with the target device such that the replacement file overwrites the privacy information of the user stored in the target device with the data entries of the replacement file. Responsively, the method includes disabling radio frequency communication channel that allows the first device to communicate with the second device. Furthermore, the method includes restoring the data file in the source computing device using the backup copy of the data file.

In yet another aspect, the present disclosure relates to a system that comprises a first device that includes an antenna assembly and an address reading engine that is communicatively coupled to the antenna assembly. The address reading engine generates an inquiry message that requests a second device located in an area that is within an antenna range of an antenna of the antenna assembly to identify itself. Then, the address reading engine transmits the inquiry message via the antenna. Responsively, the address reading engine receives identification data from the second device via the antenna assembly of the first device. The second device comprises a radio that allows the second device to communicate using a short-range wireless technology, and the second device is configured to transmit the identification data responsive to receiving the inquiry message. The identification data comprises a unique identifier of the second device that is associated with the short-range wireless technology. The address reading engine parses the received identification data to retrieve the unique identifier and tracks the second device using the unique identifier of the second device.

These and other aspects, features, and embodiments of the disclosure will become apparent to a person of ordinary skill in the art upon consideration of the following brief description of the figures and detailed description of illustrated embodiments.

BRIEF DESCRIPTION OF THE FIGURES

The foregoing and other features and aspects of the present disclosure are best understood with reference to the following description of certain example embodiments, when read in conjunction with the accompanying drawings, wherein.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a privacy information cleaning system and method to easily and consistently clean sensitive and personal information (herein 'privacy information') of a user from any appropriate target device that stores the privacy information of the user, where the privacy information is shared with the target device via a user's source device that is communicatively connected and synchronized with the target device in a short-range wireless network.

The privacy information cleaning system and method of the present disclosure provides a technical solution to a technical problem of information security and privacy data protection in short-range wireless networks, and particularly protection of privacy data stored in a target device when the source device and target device are communicatively coupled and synchronized. Further, the privacy information cleaning system and method of the present disclosure provides a practical application that allows the user to have control over the user's privacy information after the user has shared said privacy information with a target device. Furthermore, the privacy information cleaning system and method provides a practical application that allows a user to easily and consistently clean sensitive and personal information of the user from any appropriate target device that stores said sensitive and personal information of the user that has been shared therewith over a short-range wireless network, thereby protecting consumers' privacy and personal information.

Before discussing the example embodiments directed to the privacy information cleaning system and method, it may assist the reader to understand the various terms used herein by way of a general description of the terms in the following paragraphs.

The term 'privacy information' as used herein may generally refer to any information stored in a vehicle that a user does not want an unauthorized party to access. Privacy information may include, personal or user specific information corresponding to the user that is stored in an in-vehicle module (e.g. navigation information, user profiles and preferences, etc.) and/or a remote module that connects to the in-vehicle module that similarly stores or "syncs" with the vehicle and captures users' privacy information. For example, the privacy information may include the home and/or business address for the user and a contact list of individual names, addresses, phone numbers, passwords, etc. Privacy information may further include navigational data, such as locations that the user driver to and from (e.g., a home or business or other points of interest). Privacy information may also include financial information, such as a bank account number or credit card number, corresponding to the user of the vehicle. An appropriate in-vehicle module may utilize this financial information to pay fees (e.g., toll fees) associated with the operation of the vehicle or to make other payments. Privacy information may also include the metadata associated with the users and their devices (e.g. Bluetooth MAC addresses of connected devices). Privacy information may also include logs of events that are registered by the target device such as in vehicle systems as a product of the users' activities with the vehicle (e.g. phone connection time and place, vehicle status at the time of the connection, social media entries done while in-vehicle, etc.).

The term 'synchronization' as used herein may generally refer to data synchronization between the devices that are communicatively coupled in a short-range wireless network. Data synchronization may include a process of establishing consistency among data from a data storage of a source device to a target device and vice versa and the continuous harmonization of the data over time.

The term 'target device' as used herein may generally refer to any appropriate device that can be communicatively coupled with a source device via a communication network and that can store data (e.g., privacy information of a user) residing on the source device when the source device of a user is communicatively coupled to the target device. The data (e.g., privacy information) may either be shared with the target device by the source device or retrieved from the source device by the target device, e.g., via data synchronization. In one example, the communication network may be a short-range wireless network. However, in other examples, the communication network may include any other appropriate wireless or wired network. Example target devices may include, but are not limited to, vehicle infotainment systems, telematics devices, vehicle tracking devices, etc. The target device may interchangeably referred to as the second device.

The term 'source device' as used herein may generally refer to any appropriate device that can be communicatively coupled to and share data with another device (e.g., target device) via a communication network. In one example, the communication network may be a short-range wireless network. However, in other examples, the communication network may include any other appropriate wireless or wired network. The source device may be interchangeably referred to as a first device.

The term 'short-range wireless network' as used herein may refer to any appropriate wireless network that allows short-range wireless communication between devices in the wireless network. A short-range wireless network may include wireless personal area networks (WPAN), wireless body area network (WBAN), wireless nano networks. In some example embodiments, a short-range wireless network may even include a wireless local area network (WLAN). Example, short-range wireless network technology or standards may include, but are not limited to, Bluetooth, Zigbee, NFC, ANT+, IEEE 802.15.4, Infrared wireless technology, Z-wave, etc.

An example aspect of the privacy information cleaning system and method includes a privacy information cleaning module that is available at a source computing device of a user. In the example aspect, the source computing device of the user may be communicatively coupled and synchronized with a target device in a wireless personal area network, e.g., via Bluetooth. Accordingly, one or more data files in a data storage of the source computing device of the user may be shared with and a copy thereof may be stored in the target device. The one or more data files may include privacy information of the user.

In the example aspect, the privacy information cleaning module is activated when a request is received from a user to clean privacy information of the user that is stored in the target device with which the computing device of the user is communicatively connected and synchronized. Responsive to receiving the request, the privacy information cleaning module switches the source computing device of the user from an existing operational mode to a cleaning operational mode where one or more radio frequency communications of the source computing device, except the wireless personal area network-based communication, may be disabled or switched off. Then, the privacy information cleaning module backs up or stores at least one copy of the one or more data files of the source computing device of the user that have been shared with, stored in, and are to be cleaned from the target device.

In one example, the at least one copy of the one or more data files may be stored at an alternate location (different from location of original data files) or at multiple locations within the source computing device of the user where the at least one copy of the one or more data files may be unaffected by a deletion of the original data files from the source computing device. In some examples, additionally, the storage locations within the source computing device for storing the at least one copy of the one or more data files are selected such that the copy of the one or more data files may not be visible or discoverable by the target device when the source computing device of the user and the target device are communicatively coupled in a wireless personal area network and are being synchronized. Further, the storage locations are selected such that the copy of the one or more data files are restorable from said storage locations by the source computing device later. In another example, the at least one copy of the one or more data files may be stored external to the source computing device, such as in a cloud data storage platform. If the copy of the one or more data files is to be stored external to the source computing device, then, during the cleaning operational mode, the privacy information cleaning module enables at least one other wired or radio frequency communication (e.g., local area network communication or wide area network communication) of the source computing device to allow communication with an external data store, e.g., via the Internet. Responsive to storing the copy of the one or more data files externally, the privacy information cleaning module disables the at least one other one other wired or radio frequency communication of the source computing device.

In either case, once the one or more data files have been backed up, the privacy information cleaning module deletes the original data files from the source computing device of the user and generates a replacement data file for each of the deleted data files. The replacement data files may be identical to or a different version of the deleted data files, but with data entries that are either blank or populated with random unrelated or non-sensitive data. Then, when the source computing device of the user connects with the target device, the privacy information cleaning module uploads the replacement data files to the target device or the devices (source and target) are synchronized to update or overwrite the one or more data files stored in the target device with the replacement files in the source computing device that comprise blank data entries or random unrelated or non-sensitive data entries, where the replacement data files correspond to the one or more data files. As a result, the one or more data files that are stored in the target device and that comprise the privacy information of the user are updated or overwritten with blank data entries or random unrelated or non-sensitive data entries, thereby ensuring that the target device no longer includes the privacy information of the user that was shared with the target device by the source computing device of the user. In other words, the replacement data files of the source computing device are uploaded or synchronized with the one or more data files in the target device that comprise the privacy information to clean the privacy information stored in the target device.

Responsive to uploading the replacement data files, the privacy information cleaning module switches the source computing device of the user from the cleaning operational mode to a post cleaning operational mode where the wireless personal area network communication of the source computing device is disabled. Then, the privacy information cleaning module deletes the replacement data files, restores the one or more data files comprising the privacy information in the source computing device of the user, and switches the source computing device back to the existing operational mode under which the source computing device was operating prior to the cleaning process. The one or more data files comprising the privacy information is restored using the at least one copy of the one or more data files stored either in the computing device or the external data storage platform. Prior to switching the source computing device back to the existing operational mode, the privacy information cleaning module determines or ensures that the source computing device of the user is outside a communication range of the target device to prevent the one or more data files comprising the privacy information being re-shared or synchronized with the target device.

One example environment where the privacy information cleaning system and method of the present disclosure may be used is in the field of automobiles, where the source computing device of the user is a mobile computing device of a user, the target device with which the source computing device is communicatively coupled and synchronized is an infotainment system of a vehicle, and the wireless personal area network is a Bluetooth network (piconet) formed by the mobile computing device and the infotainment system that are communicatively connected via the Bluetooth communication protocol. In other words, in said example environment, the privacy information cleaning system and method of the present disclosure is used to clean privacy information, such as, the identity of the user, contacts list, logs of phone calls, text messages, home addresses, work addresses, and other navigational data (GPS data), photos, music, videos, and other multimedia files, apps installed and synced (e.g. via Apple CarPlay or Android Auto) etc., from an infotainment system of a vehicle, where said privacy information was shared with the infotainment system by the mobile computing device of the user via Bluetooth pairing, connection, and synchronization. Said privacy information is stored in a storage device associated with the infotainment system of the vehicle.

Even though the present disclosure may describe the privacy information cleaning system and method in the context of cleaning privacy information that has been stored in the infotainment system of a vehicle through Bluetooth connection, one of skill in the art can understand and appreciate that the privacy information cleaning system and method can be used in any other appropriate environments where privacy information of a user associated with a first device (interchangeably referred to as 'source device') is stored in a second device (interchangeably referred to as 'target device') that forms a wireless personal area network with the first device. For example, the first device may be a mobile computing device of a user and the second device may be an activity tracker, such as a Fitbit device. In said example, once the Fitbit device is paired with and connected to the mobile computing device of the user via Bluetooth, the Fitbit device may track and store a location of the user, the user's activities, and other privacy information of the user. In said example, the privacy information cleaning system and method of the present disclosure may be used to clean privacy information stored in the Fitbit device by using the privacy information cleaning module available in the mobile computing device of the user. Furthermore, even though the present disclosure describes the privacy information cleaning system and method as being used in a Bluetooth environment, one of ordinary skill in the art can understand and appreciate that in other example embodiments, the privacy information cleaning system and method can be used in any other appropriate short-range wireless communication network environment where privacy information of a user from a first device is shared with and stored in a second device with which the first device forms the short-range wireless communication network without departing from a broader scope of the present disclosure. For example, the privacy information cleaning system and method may be used in Zigbee or WiFi networks. Furthermore, the privacy information cleaning system and method are not limited to wireless personal area networks and can be used in other appropriate wireless or wired network environment where the devices in the network are connected to each other and are data synchronized.

Figure 1:
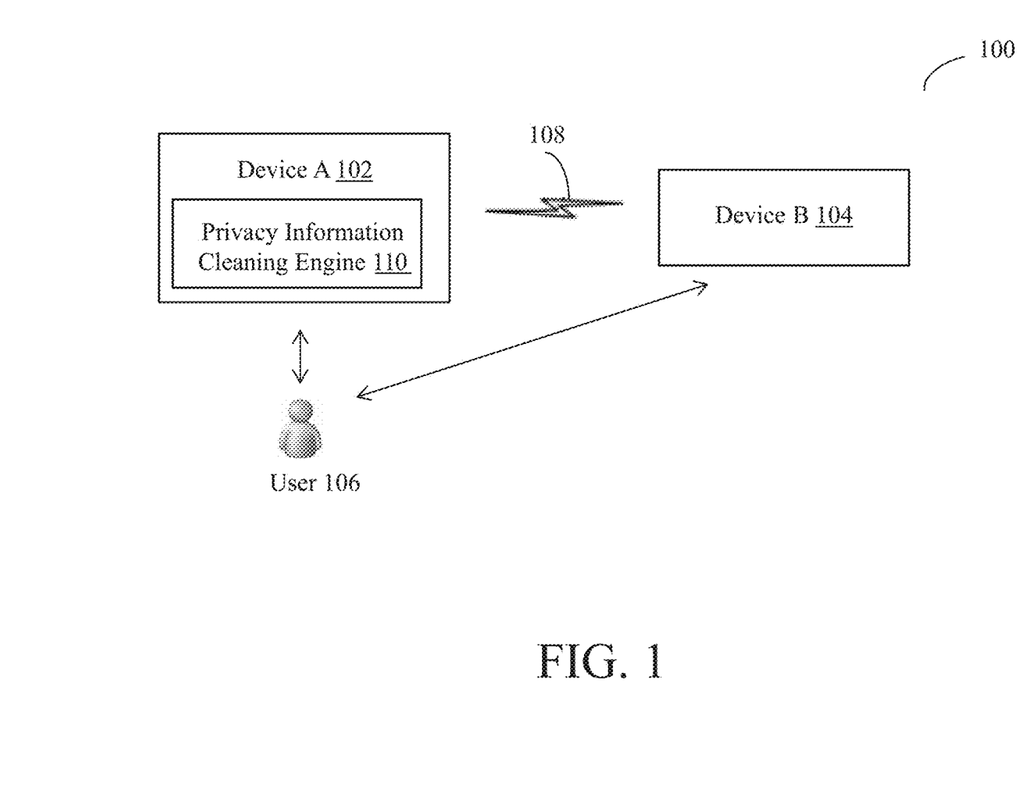
FIG. 1 illustrates an example system architecture for privacy and security of personal information stored in devices that are communicatively connected in a wireless personal area network, in accordance with example embodiments of the present disclosure.

Referring to FIG. 1, the privacy information cleaning system 100 includes a first device 102. As described above, an example first device 102 may include a computing device that is associated with a user 106. The first device 102 may include one or more radios, where one radio is used for short-range wireless communication and another radio is configured for long-range wireless communication. In some examples, the different radios may support short-range communications via different short-range communication technologies and long-range communications. For example, one radio may support Bluetooth communication, while another radio may support Zigbee communication, and yet another radio may support Wi-Fi or cellular communications.

In one example embodiment, the first device 102 may be a portable computing device that is Bluetooth enabled and has a display, a user interface, and/or network communication capabilities (e.g., Internet connectivity), such as, a mobile phone, a laptop, a tablet, a smart phone, any other appropriate hand-held device, etc. In some example embodiments, the user computing device may also include a desktop. Hereinafter, the first device 102 may be referred to as the 'mobile computing device 102'.

Further, as illustrated in FIG. 1, the privacy information cleaning system 100 includes a second device 104. In one example embodiment, the second device 104 may include a vehicle infotainment system of a vehicle that is associated with the user 106. The user 106 may include either a private owner of the vehicle, other users who are related to and are authorized by the private owner to drive the vehicle (e.g., spouse, kids, friends, etc.), an individual who leases or rents the vehicle from a dealership or a rental agency. Hereinafter, the second device 104 may be referred to as the 'vehicle infotainment system 104'.

The user 106 may establish a Bluetooth connection 108 between the mobile computing device 102 of the user 106 and the vehicle infotainment system 104 by pairing the mobile computing device 102 with the vehicle infotainment system 104. Responsively, one or more data files from the mobile computing device 102 may be shared with the vehicle infotainment system 104 by synchronizing the data from the mobile computing device 102 with the vehicle infotainment system 104. The one or more data files may comprise privacy information of the user 106, such as, contacts list, contact addresses, financial information, etc. The one or more data files comprising privacy information are shared with the vehicle infotainment system 104 of the vehicle for various conveniences of the user 106, such as, making hands-free phone calls, getting navigation information, opening garage doors, etc. The vehicle infotainment system 104 stores the one or more data files comprising the privacy information (e.g., a shared copy of the one or more data files) in a database associated with the vehicle infotainment system 104 to improve a response time of the vehicle infotainment system 104. Additionally, the vehicle infotainment system 104 may store a log of phone calls, text messages, and navigational information when the mobile computing device 102 is connected to and uses the vehicle infotainment system 104 via the Bluetooth connection 108.

As illustrated in FIG. 1, the mobile computing device 102 of the user 106 includes a privacy information cleaning engine 110 (e.g., front end application). The user 106 can use the privacy information cleaning engine 110 to clean the one or more data files comprising the privacy information of the user from the vehicle infotainment system 104 of a vehicle. In one example embodiment, the privacy information cleaning engine 110 may be a stand-alone mobile application that the user 106 can download to the mobile computing device 102. In another example embodiment, the privacy information cleaning engine 110 may be a software development kit (SDK) that may be embedded into an internal or external (third party) program code or application. For example, the privacy information cleaning engine 110 may be embedded within an application of a rental agency. In yet another example embodiment, the features of the privacy information cleaning engine 110 may be offered as a service via webservers and/or Application Programming Interfaces (APIs).

Figure 2:
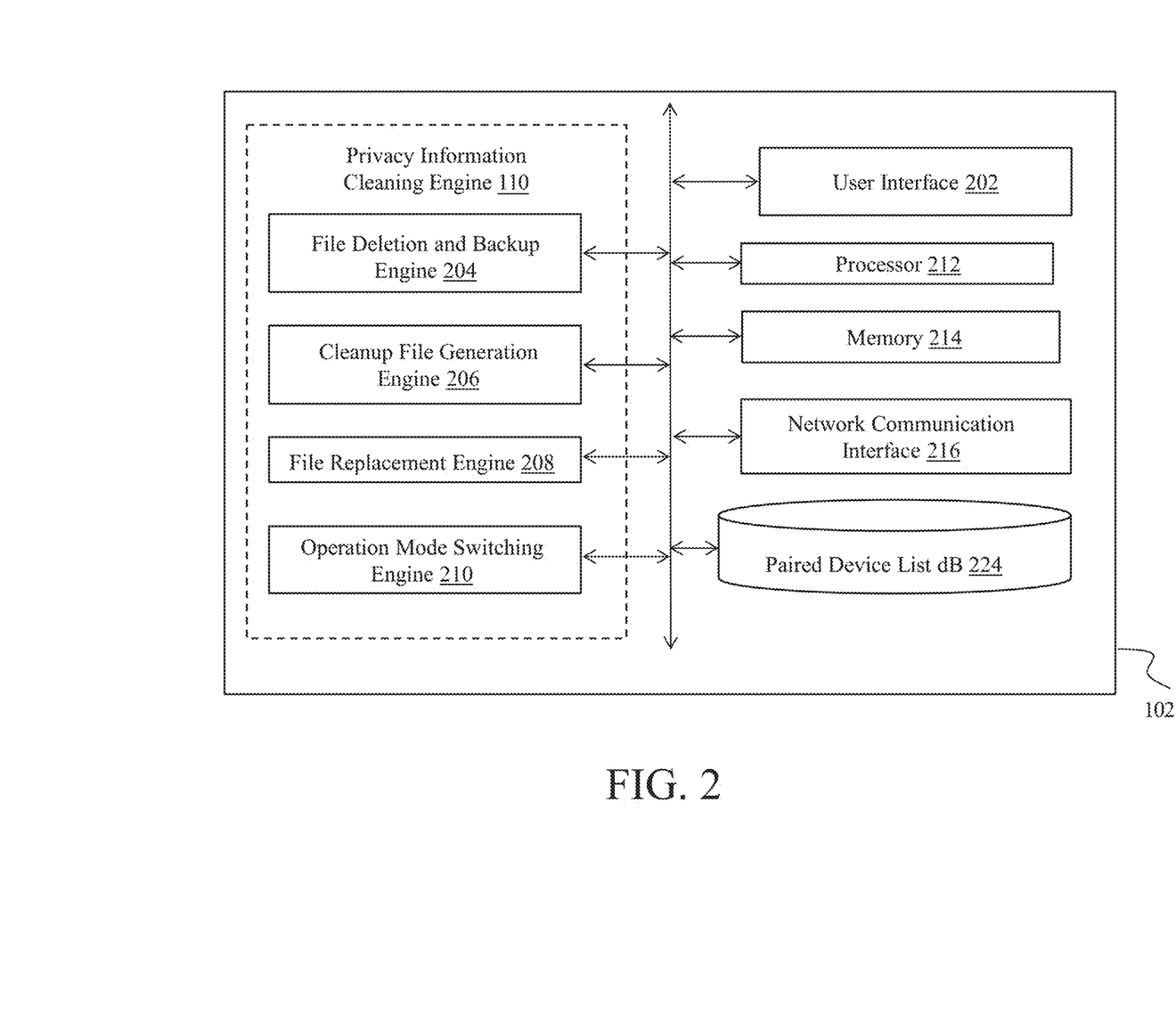
FIG. 2 illustrates an example block diagram of a source device that is communicatively connected with a target device in a wireless personal area network, where the source device includes a privacy information cleaning module, in accordance with example embodiments of the present disclosure.
Figure 3A:
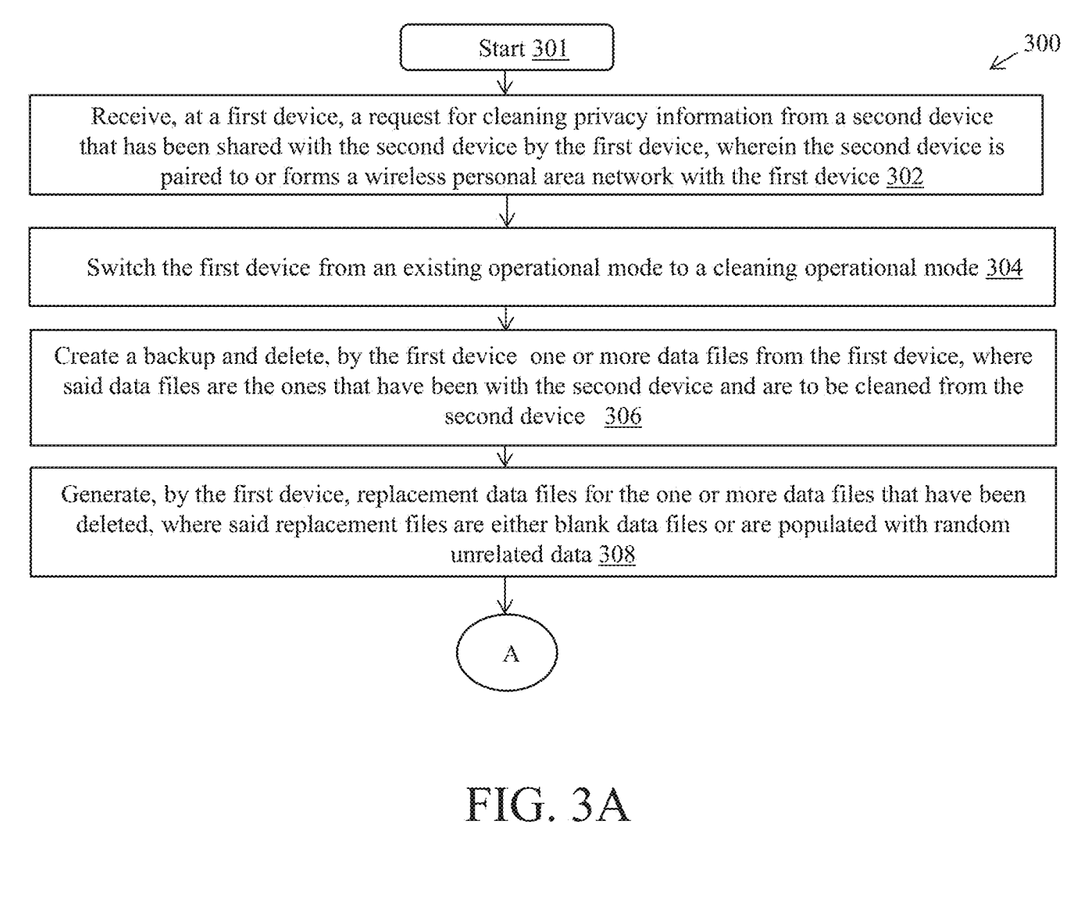
FIGS. 3A-3B (collectively FIG. '3') are flowcharts that illustrate an example method of the privacy information cleaning module of the source device to clean personal information of a user that is shared with the target device and is stored in the target device, in accordance with example embodiments of the present disclosure.
Figure 3B:
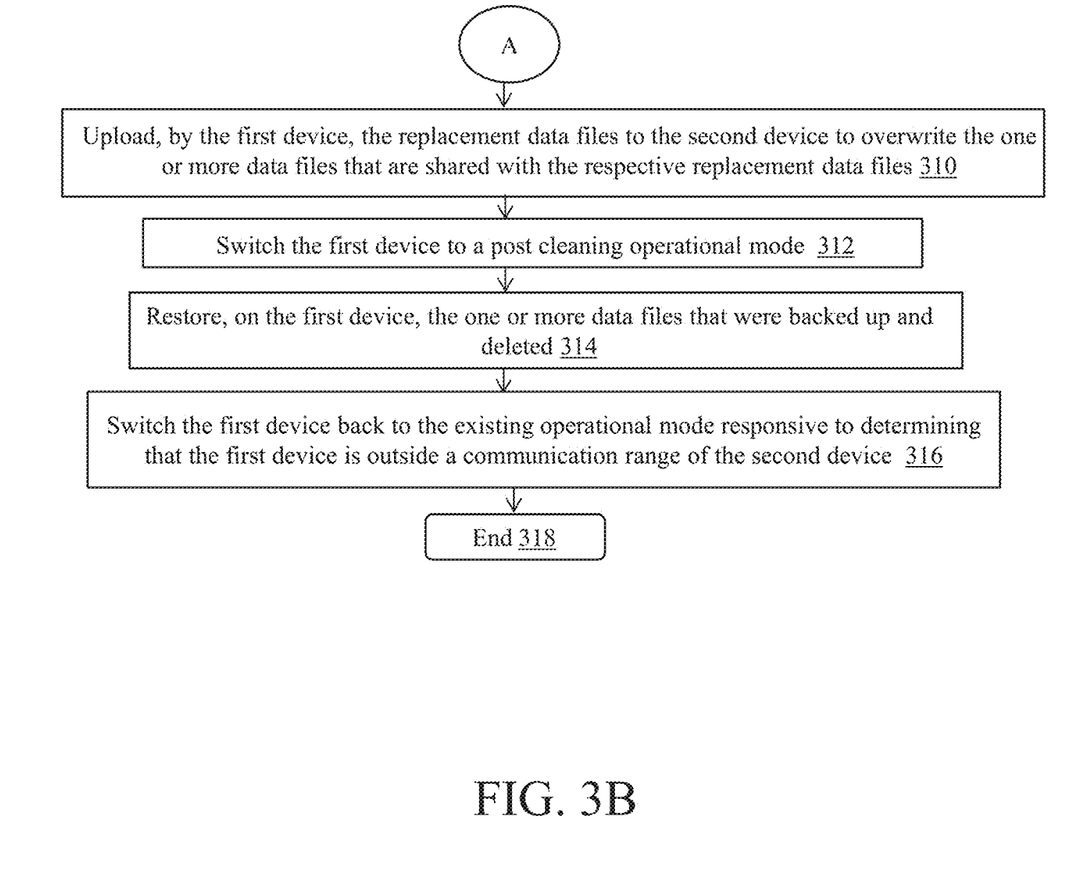

The operation of the privacy information cleaning engine 110 will be described below in greater detail in association with FIG. 3 by referring to FIG. 2 which illustrates the various example components of mobile computing device 102 and the privacy information cleaning engine 110 disposed in the mobile computing device 102. FIG. 3 illustrates a flowchart associated with the operation of the privacy information cleaning engine 110. Although specific operations are disclosed in the flowcharts illustrated in FIG. 3, such operations are only non-limiting examples. That is, embodiments of the present invention are well suited to performing various other operations or variations of the operations recited in the flowcharts. It is appreciated that the operations in the flowcharts illustrated in FIG. 3 may be performed in an order different than presented, and that not all the operations in the flowcharts may be performed.

All, or a portion of, the embodiments described by the flowcharts illustrated in FIG. 3 can be implemented using computer-readable and computer-executable instructions which reside, for example, in a memory of the mobile computing device 102. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Referring to FIG. 3, the process 300 of cleaning the privacy information of the user 106 stored in the vehicle infotainment system 104 of a vehicle begins at operation 302 where the user 106 opens a privacy information cleaning application on the mobile computing device 102. When the user 106 opens the privacy information removal application via the user interface 202, in operation 302, the privacy information cleaning engine 110 receives a request for cleaning the privacy information of the user 106 that is stored in the vehicle infotainment system 104. As described above, the privacy information that is stored in the vehicle infotainment system 104 has been shared with the vehicle infotainment system 104 by the mobile computing device 102 via a Bluetooth connection 108.

In some examples, a mechanism may be built into the privacy information cleaning engine 110 to ensure that the request is not unintentional. This prevents cleaning of the privacy information of the user 106 from the vehicle infotainment system 104 resulting from an unintentional access of the privacy information cleaning application, such as when a user 106 opens the privacy information cleaning application by mistake, when an unauthorized user (e.g., child who may have access to the mobile computing device 102) initiates the request, etc. Said mechanism may include additional authentication, such as, but not limited to, requesting the user 106 to confirm by clicking a link sent to the user via an email or text message, etc.

Responsive to receiving the request to clean the privacy information stored in the vehicle infotainment system 104 and/or ensuring that the request is not unintentional, in operation 304, the operational mode switching engine 210 of the privacy information cleaning engine 110 may store an existing operational mode of the mobile computing device 102 in the memory 214 of the mobile computing device 102. Storing the existing operational mode of the mobile computing device 102 may include recording a status of all the relevant components of the mobile computing device 102 before switching to a different mode of operation. The existing operational mode may be stored for a future use, e.g., when the mobile computing device 102 has to be switched back to or recovered to the existing operational mode.

Then, in operation 304, the operational mode switching engine 210 may operate in concert with the network communication interface 216 to switch the mobile computing device 102 from the existing operational mode to a cleaning operational mode. In the cleaning operational mode, all radio-frequency communication (or corresponding radios) by the mobile computing device 102, except the channel used to overwrite the information (e.g. the Bluetooth communications), may be suspended or disabled.

Once the mobile computing device 102 has been switched to the cleaning operational mode, in operation 306, the file deletion and backup engine 204 of the privacy information cleaning engine 110 may operate in concert with the processor 212 to create at least one back up copy of one or more data files of the mobile computing device 102. The one or more data files are those data files that comprise the privacy information that has been shared by the mobile computing device 102 with the vehicle infotainment system 104 and is stored in the vehicle infotainment system 104. For example, the one or more data files may include a contacts list, contact addresses, phone logs, etc. In said example, the file deletion and backup engine 204 of the privacy information cleaning engine 110 may create at least one back up copy of the contacts list, contact addresses, phone logs, etc., of the mobile computing device 102 that has been shared with and stored in the vehicle infotainment system 104.

Responsive to creating the at least one back copy of the one or more data files, in operation 306, the file deletion and backup engine 204 stores the at least one back up copy of the one or more data files in another location or in multiple locations within the mobile computing device 102. The location(s) for storage of the at least one back up copy of the one or more data files may be selected such that the at least one back up copy of the one or more data files remains hidden from the vehicle infotainment system 104 at the stored location(s) when the vehicle infotainment system 104 is connected to the mobile computing device 102 via the Bluetooth connection 108. Further, location(s) for storage of the at least one back up copy of the one or more data files may be selected such that the at least one back up copy of the one or more data files is not affected by a deletion of the one or more data files, i.e., original version of the one or more data files.

In some example embodiments, the at least one back up copy of the one or more data files of the mobile computing device 102 may be stored external to the mobile computing device 102, such as in a cloud storage platform (Dropbox, Google Drive). In the example embodiment where the at least one back up copy of the one or more data files of the mobile computing device 102 is stored external to the mobile computing device 102, operation 304 of switching the mobile computing device to the cleaning operation mode may be performed after storing the at least one back up copy of the one or more data files of the mobile computing device 102 in an external storage.

In either case, responsive to storing the at least one back up copy of the one or more data files of the mobile computing device 102, in operation 306, the file deletion and backup engine 204 of the privacy information cleaning engine 110 operates in concert with the processor 212 to delete the one or more data files from the mobile computing device 102.

In other example embodiments, the mobile computing device 102 may be configured to be synchronized with other external storage platforms, such as Google Drive, Dropbox, etc., in which case, the file deletion and backup engine 204 may not create and store a backup copy of the data files under the presumption that the one or more data files of the mobile computing device 102 have already been backed up in the external storage platforms as part of the synchronization between the mobile computing device 102 and the external storage platforms. In said other example embodiments, by virtue of switching the mobile computing device 102 to the cleaning mode where all other radio frequency communications, except the Bluetooth communications, are disabled, the privacy information cleaning engine 110 presumes that one or more data files that are backed up in the external storage devices will not be corrupted and can be used for restoration of the data files at a later time because the mobile computing device 102 cannot communicate with the external data storage platforms. Accordingly, in said other example embodiments, in operation 306, the file deletion and backup engine 204 of the privacy information cleaning engine 110 may directly delete the one or more data files without the step of creating and storing a back copy of the one or more data files of the mobile computing device 102. However, in some cases, the file deletion and backup engine 204 may expressly create and store at least one back copy of the one or more data files of the mobile computing device 102 even if the mobile computing device 102 is synchronized with an external storage platform to ensure that the latest or most recent copy/version of the data files are available for restoration at a later time, e.g., after the cleaning process 300.

After deleting the one or more data files, in operation 308, the cleanup file generation engine 206 of the privacy information cleaning engine 110 may operate in concert with the processor 212 to generate a replacement data file for each of the deleted one or more data files. In one example embodiment, the replacement data file corresponding to a deleted data file may have data entries that are blank (e.g., all the bits are zeroes). For example, the cleanup file generation engine 206 may generate a replacement contact list where each entry of the contact list is empty/blank. In another example embodiment, the replacement data file corresponding to a deleted data file may have data entries that are populated with random unrelated or non-sensitive data (e.g. a random string of characters of the maximum acceptable character length). For example, each entry of the replacement contact list generated by the cleanup file generation engine 206 may be populated with random digits, such as 1, 2, 3, etc. That is, an entry of the replacement contact list may include the numeral '1' under name, '1' under address, '2' under phone number, etc. In some examples, the unrelated or non-sensitive data that is populated in the replacement data files may not be random. Instead, the unrelated or non-sensitive data may be pre-determined. In some example embodiments, the replacement file may be created prior to deleting the one or more data files from the mobile computing device 102.

Once the replacement data files are created, the in operation 310, the file replacement engine 208 of the privacy information cleaning engine 110 operates in concert with the processor 212 to upload (or automatically synchronize files if the mobile computing device 102 and the vehicle infotainment system 104 are communicatively connected via the Bluetooth connection 108) the replacement data files to the vehicle infotainment system 104. The uploaded replacement files cause the vehicle infotainment system 104 to update or overwrite the one or more data files of the mobile computing device 102 that are stored in the vehicle infotainment system 104 with the corresponding replacement data files of the mobile computing device 102. For example, the entries of the contacts list stored in the vehicle infotainment system 104 will be updated or overwritten with the data entries of the replacement contact list. The vehicle infotainment system 104 may recognize the one or more data files of the mobile computing device 102 that are stored in the vehicle infotainment system 104 as being an older version and the replacement data files as being the newer version of the one or more data files. Accordingly, for establishing consistency with the data files of the mobile computing device 102, the vehicle infotainment system 104 may update or overwrite the one or more data files stored in the vehicle infotainment system 104 with the new data files (e.g., replacement data files). This in turn, cleans the privacy information of the user 106 from the vehicle infotainment system 104 and leaves either blank or unrelated and/or non-sensitive information in the vehicle infotainment system 104.

In addition, should any remote storages owned by third parties (e.g. automotive OEM, telematics company, insurance, etc.) be synced with the vehicle infotainment system 104 of the vehicle, the new uploaded blank, unrelated, or random data filled fields might also have the effect of deleting user's privacy information from those third parties as well, further helping to protect the privacy and anonymizing the user.

In one example embodiment, the user 106 may check the vehicle infotainment system 104 to determine and verify that the privacy information has been deleted. Further, the privacy information cleaning engine 110 may be configured to request the user to provide a feedback regarding whether the privacy information of the user is successfully removed from the vehicle infotainment system 104. The feedback may be transmitted to and stored in an external database associated with the mobile computing device 102 and/or in a memory of the mobile computing device 102. Further, the feedback may be transmitted for record to an owner or entity associated with the vehicle (e.g., rental agency, leasing company, etc.) provided the user does not own the vehicle (e.g., leased vehicle, rented vehicle, etc.)

Responsive to uploading the replacement data files to the vehicle infotainment system 104 and thereby cleaning the privacy information stored in the vehicle infotainment system 104 (and/or other related devices), in operation 312, the operational mode switching engine 210 of the privacy information cleaning engine 110 operates in concert with the network communication interface 216 to switch the mobile computing device 102 from the cleaning operational mode to a post cleaning operational mode in which the Bluetooth communications (or associated radio) of the mobile computing device 102 is suspended or disabled. Then, in operation 314, the file replacement engine 208 of the privacy information cleaning engine 110 operates in concert with the processor 212 and the memory 214 to delete the replacement data files. Further, in operation 314, file replacement engine 208 may restore the one or more data files comprising the privacy information that were deleted prior to creating the replacement data files. The one or more data files comprising the privacy information may be restored using the at least one back up copy of the one or more data files that are stored within the mobile computing device 102 or external to the mobile computing device 102. For restoring the one or more data files from the at least one back up copy of the one or more data files stored external to the mobile computing device 102, one or more radio frequency communications (or associated radios) other than the Bluetooth communications may be restored or enabled.

Further, in operation 316, the operational mode switching engine 210 of the privacy information cleaning engine 110 operates in concert with the processor 212, the memory 214, and the network communication interface 216 to switch the mobile back to the existing operational mode, i.e., the operational mode that existed prior to the privacy information cleaning processes 300. The switch back to the existing operational mode may be responsive to determining that the mobile computing device 102 is outside a radio range of the vehicle infotainment system 104.

The processor 212 of the mobile computing device 102 may be a multi-core processor or a combination of multiple single core processors. Further, the memory 214 that is coupled to the processor 212 may be non-transitory storage medium, in one embodiment, and a transitory storage medium in another embodiment. The memory 214 may include instructions that may be executed by the processor 212 to perform operations of the privacy information cleaning engine 110 and other operations of the mobile computing device 102. In other words, operations associated with the different engines 204-210 may be executed using the processor 212. Further, the mobile computing device 102 may be communicatively coupled and communicate with the other devices or data sources via the network communication interface 216 that may include wired or wireless network interfaces and/or radios associated with wide area networks, local area networks, personal area networks, nanonetworks, etc.

Typically, in Bluetooth connections, a trusted bond is formed between two devices once they undergo the Bluetooth pairing process. The trusted bond allows the two paired devices to recognize each other via their respective Bluetooth device addresses and/or friendly names, and automatically connect to each other when they are in a radio communication range of each other without any additional authentication. The Bluetooth device addresses and/or friendly names of the paired devices may be stored in a database of each device, such as, a paired device list database 224 of the mobile computing device 102. Accordingly, the process 300 of the privacy information cleaning engine 110 to clean the privacy information of the user 106 stored in the vehicle infotainment system 104 may not include any user authentication steps. Instead, since the privacy information cleaning engine 110 is operating on the mobile computing device 102 that has already been paired and has already formed a trusted bond with the vehicle infotainment system 104, the Bluetooth device addresses and/or a friendly names of the mobile computing device 102 and the vehicle infotainment system 104 may serve as a device level authentication for a trusted communication between the mobile computing device 102 and the vehicle infotainment system 104.

Even though the present disclosure describes that in one example embodiment, the first device 102 is a mobile computing device, one of ordinary skill in the art can understand and appreciate that in other example embodiments, the first device 102 may include any other appropriate Bluetooth enabled device without departing from a broader scope of the present disclosure. Further, the first device 102 may include any other appropriate additional modules or engines without departing from a broader scope of the present disclosure.

For example, in one example, the first device 102 may include Bluetooth enabled electronic device having a transceiver, a high-power directional antenna, and an address reading engine (e.g., Bluetooth sniffing application). The address reading engine may or may not be part of the privacy information cleaning engine 110. That is, the address reading engine can operate independent from the privacy information cleaning engine. In particular, the address reading engine may be configured to transmit an inquiry message that requests any Bluetooth enabled device that is located in the antenna range of the high-power directional antenna to identify itself. Responsively, the address reading engine receives identification data from a device located in the antenna range, where the identification information includes a unique identifier, such as a Bluetooth device address of the device. The address reading engine may parse the identification data, retrieve the unique identifier, and store the unique identifier (or transmit to the remote server) for surveillance, verification, or any other appropriate application that tracks the Bluetooth enabled device. Said first device 102 may be used to read Bluetooth device addresses of any appropriate Bluetooth enabled devices for surveillance, such as Bluetooth device addresses of the infotainment system, black box, or other digital or electronic systems of a vehicle that may be either in a discoverable or non-discoverable mode and/or is transmitting its Bluetooth address. In said example, the first device 102 may be located in a border crossing checkpoint and the antenna of the first device 102 may be directed towards the road to read the Bluetooth device address of each vehicle that crosses the border. The Bluetooth device address of the vehicle may be used as a unique identifier such as a VIN number to uniquely identify the vehicles crossing the border. The first device 102 that is configured to read Bluetooth device addresses of Bluetooth enabled devices can be used in any other appropriate scenarios without departing from a broader scope of the present disclosure. For example, a first device 102 having the address reading module can be used to: (a) remotely and independently verify the identity of a vehicle by reading the unique identifiers of the wireless devices installed in a vehicle (e.g. the MAC address of the infotainment Bluetooth module or the MAC address of the in-car WiFi) and match it against a database of VINs; and/or (b) to accurately and remotely geolocate and timestamp the presence of a specific vehicle by triangulating the signals emitted by that car's wireless devices (e.g. the in-car Bluetooth or WiFi). Geolocating the vehicle by triangulating the signals emitted by the car's wireless devices helps avoid having to install any other tracking devices on cars (e.g. RFID tags) which would yield great savings. Examples of areas where this would apply include, but are not limited to, law enforcement, tollbooths and parking, logistics and supply chain, state and federal government applications (e.g. could "replace" a plate).

Further, even though the present disclosure describes that in one example embodiment the connection is via Bluetooth protocol, one of skill in the art can understand and appreciate that in other example embodiments, other wireless protocols may be used, such as WiFi, RFIDs, NFCs, etc., without departing from a broader scope of the present disclosure.

Further, even though the present disclosure describes that in one example embodiment the second device 104 is a vehicle infotainment system, one of skill in the art can understand and appreciate that in other example embodiments, the second device 104 can include any other appropriate Bluetooth enabled device, such as a headphone, keyboard, wearable optic head mounted display (like Google glass), a Point of Sale system, or another mobile computing device, a Smartphone, a smart device, etc., without departing from a broader scope of the present disclosure.

Although the present embodiments have been described with reference to specific example embodiments, it will be evident that various modifications and changes may be made to these embodiments without departing from the broader spirit and scope of the various embodiments. For example, the various devices, engines, and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A privacy information cleaning system comprising:
a first device that is communicatively coupled to a second device, the first device comprising a privacy information cleaning engine that is configured to:
receive, at the first device, a request to clean privacy information of a user that is shared with the second device by the first device and is stored in the second device,
responsively, create and store a backup copy of a data file of the first device that comprises the privacy information of the user that has been shared with and stored in the second device;
delete the data file from the first device;
create a replacement file for the data file that is deleted, wherein data entries in the replacement file are populated with non-sensitive data, and
upload the replacement file to the second device to overwrite the privacy information of the user stored in the second device with the data entries of the replacement file;
responsively, disable radio frequency communication channel that allows the first device to communicate with the second device;
restore the data file in the first device using the backup copy of the data file; and
enable the radio frequency communication channel when the first device is outside a radio range of the second device.

2. The privacy information cleaning system of claim 1, wherein prior to creating and storing the backup copy of the data file disabling all other radio frequency communication channels except the radio frequency communication channel that allows the first device to communicate with the second device.

3. The privacy information cleaning system of claim 1, wherein the backup copy of the data file is stored in a location within a memory associated with the first device such that the backup copy of the data file is at least one of hidden from the second device and is unaffected by the deletion of the data file from the first device.

4. The privacy information cleaning system of claim 1, wherein the backup copy of the data file is stored in a data storage system that is external to the first device.

5. The privacy information cleaning system of claim 1, wherein the non-sensitive data comprises random data that is unrelated to the privacy information of the user.

6. The privacy information cleaning system of claim 1, wherein the non-sensitive data comprises pre-determined data that is unrelated to the privacy information of the user.

7. The privacy information cleaning system of claim 1, wherein to populate the data entries of the data file with non-sensitive data, the privacy information cleaning engine is configured to leave the data entries of the data file empty.

8. The privacy information cleaning system of claim 1, where the radio frequency communication channel through which the first device communicates with the second device is a Bluetooth communication channel.

9. The privacy information cleaning system of claim 1, wherein the first device is a portable computing device.

10. The privacy information cleaning system of claim 1, wherein the second device comprises one of a vehicle infotainment unit, a smart device, a wireless activity tracker, and another portable computing device.

11. A non-transitory computer readable medium comprising computer readable instructions which when executed by a processor of a source computing device causes the source computing device to perform a method comprising:
responsive to receiving a request to clean privacy information of a user from a target device, creating and storing a backup copy of a data file of the source computing device, wherein the data file comprises the privacy information of the user that has been shared with the target device by the source computing device and is stored in the target device, and wherein the source computing device is communicatively coupled to the target device;

deleting the data file;

creating a replacement file for the data file that is deleted, wherein data entries in the replacement file are populated with non-sensitive data, and synchronizing the source computing device with the target device such that the replacement file overwrites the privacy information of the user stored in the target device with the data entries of the replacement file;

responsively, disabling radio frequency communication channel that allows the first device to communicate with the second device; and restoring the data file in the source computing device using the backup copy of the data file.

12. The non-transitory computer readable medium of claim 11, wherein the source computing device enables the radio frequency communication channel when the source computing device is outside a radio range of the target device.

13. The non-transitory computer readable medium of claim 11, wherein the source computing device and the target device form a wireless personal area network.

14. The non-transitory computer readable medium of claim 11, wherein the radio frequency communication channel is a Bluetooth communication channel.

15. The non-transitory computer readable medium of claim 11, wherein the source computing device is a mobile computing device, and wherein the target device is a vehicle infotainment device.

16. The non-transitory computer readable medium of claim 11, wherein the backup copy of the data file is stored in a location within a memory associated with the source computing device such that the backup copy of the data file is at least one of hidden from the target device and is unaffected by the deletion of the data file from the source computing device.

17. The non-transitory computer readable medium of claim 11, wherein the backup copy of the data file is stored in a data storage system that is external to the source computing device.

* * * * *